United States Patent
Wei et al.

(10) Patent No.: US 10,713,353 B2
(45) Date of Patent: Jul. 14, 2020

(54) SEPARATE CORES TO SECURE PROCESSES FROM SPECULATIVE ROGUE CACHE LOADS

(71) Applicant: VMware, Inc., Palo Alto, CA (US)

(72) Inventors: Michael Wei, Palo Alto, CA (US); Dan Tsafrir, Sunnyvale, CA (US); Nadav Amit, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 190 days.

(21) Appl. No.: 16/016,254

(22) Filed: Jun. 22, 2018

(65) Prior Publication Data

US 2019/0243990 A1    Aug. 8, 2019

Related U.S. Application Data

(60) Provisional application No. 62/627,064, filed on Feb. 6, 2018.

(51) Int. Cl.
*G06F 21/54*      (2013.01)
*G06F 12/1009*    (2016.01)
*G06F 12/14*      (2006.01)
*G06F 21/57*      (2013.01)
*G06F 21/52*      (2013.01)
*G06F 21/74*      (2013.01)

(52) U.S. Cl.
CPC .......... *G06F 21/54* (2013.01); *G06F 12/1009* (2013.01); *G06F 12/1441* (2013.01); *G06F 21/52* (2013.01); *G06F 21/577* (2013.01); *G06F 21/74* (2013.01); *G06F 2212/1044* (2013.01); *G06F 2212/1052* (2013.01); *G06F 2212/657* (2013.01); *G06F 2221/034* (2013.01)

(58) Field of Classification Search
CPC ...................................................... G06F 21/54
USPC ............................................................. 726/22
See application file for complete search history.

(56) References Cited

U.S. PATENT DOCUMENTS

| | | | |
|---|---|---|---|
| 7,281,102 B1 | 10/2007 | Agesen et al. | |
| 7,620,821 B1* | 11/2009 | Grohoski | G06F 9/3851 380/1 |
| 8,183,452 B2 | 5/2012 | Shirahama | |
| 9,578,032 B2 | 2/2017 | Beveridge et al. | |
| 9,665,498 B2 | 5/2017 | Kiriansky | |
| 10,002,084 B1* | 6/2018 | Warkentin | G06F 12/1491 |
| 2002/0147970 A1 | 10/2002 | Smith et al. | |
| 2006/0010440 A1 | 1/2006 | Anderson et al. | |
| 2010/0031325 A1 | 2/2010 | Maigne et al. | |

(Continued)

OTHER PUBLICATIONS

Notice of Allowance, dated Nov. 19, 2019, from a related application, U.S. Appl. No. 15/960,467.

(Continued)

*Primary Examiner* — Jacob Lipman (57) ABSTRACT

The present disclosure addresses the meltdown vulnerability resulting from speculative execution in a multi-core processing system. The operating system (OS) can be loaded for execution on one of several processing cores (OS core), while an application can be loaded for execution on another of the processing cores (application core). The OS core uses process page tables that map the entire kernel address space to physical memory. Conversely, the application core uses pages tables that map only a portion of the kernel address space to physical memory.

20 Claims, 9 Drawing Sheets

(56) References Cited

U.S. PATENT DOCUMENTS

| | | | |
|---|---|---|---|
| 2011/0161620 A1* | 6/2011 | Kaminski | G06F 12/1009 |
| | | | 711/207 |
| 2013/0117530 A1* | 5/2013 | Kim | G06F 9/45558 |
| | | | 711/206 |
| 2015/0100791 A1 | 4/2015 | Chen et al. | |
| 2016/0179547 A1 | 6/2016 | Yamada et al. | |
| 2016/0285896 A1 | 9/2016 | Caprioli | |
| 2017/0171213 A1 | 6/2017 | Beveridge et al. | |
| 2017/0286110 A1 | 10/2017 | Agron et al. | |
| 2018/0088988 A1 | 3/2018 | Rabet et al. | |
| 2018/0095765 A1 | 4/2018 | Mekkat et al. | |
| 2019/0057040 A1 | 2/2019 | Jiang | |

OTHER PUBLICATIONS

Notice of Allowance, dated Mar. 17, 2020, from a related application, U.S. Appl. No. 16/004,191.

* cited by examiner

SEPARATE CORES TO SECURE PROCESSES FROM SPECULATIVE ROGUE CACHE LOADS

CROSS REFERENCE TO RELATED APPLICATION

Pursuant to 35 U.S.C. § 119(e), this application is entitled to and claims the benefit of the filing date of U.S. Provisional App. No. 62/627,064 filed Feb. 6, 2018, the content of which is incorporated herein by reference in its entirety for all purposes.

This application is related to the following commonly owned and concurrently filed applications, the content of each of which is incorporated herein by reference in its entirety for all purposes:
- U.S. application Ser. No. 15/960,467, filed Apr. 23, 2018, entitled "32-bit Address Space Containment to Secure Processes From Speculative Rogue Cache Loads"
- U.S. application Ser. No. 16/004,180, filed Jun. 8, 2018, entitled "Compilation-Time Checks to Secure Processes From Speculative Rogue Cache Loads"
- U.S. application Ser. No. 16/004,191, filed Jun. 8, 2018 entitled "Dynamic Binary Translation to Secure Processes From Speculative Rogue Cache Loads"

BACKGROUND

The "meltdown" hardware security vulnerability enables unprivileged processes to read inaccessible kernel memory by exploiting speculative execution. Generally, a malicious user can trick the CPU into speculatively accessing u[j], such that u is a user array and j is some private data of the kernel that is unknown to the user. Because u[j] is now cached in user-space, the user can deduce the value of j by timing access to u's elements. The vulnerability affects microprocessors from Intel, IBM, and ARM released over the last two decades. Fixing the vulnerability will have a cost in terms of real dollars that may eclipse the Y2K bug. Unlike Y2K, fixing meltdown will have a lasting performance impact, as patching it requires establishing barriers to speculation and isolating the kernel.

Meltdown is made possible because operating systems traditionally map the kernel's address space into the process page tables of every process for efficiency; in other words, the virtual address space of each process includes the user address space for that process and the kernel address space. System designers rely on hardware protection to prevent unauthorized user access by marking the kernel memory pages as privileged. Unfortunately, on meltdown-vulnerable CPUs, a user process can speculatively access these privileged kernel pages, thereby leaking kernel data indirectly. With instruction pipelining, for example, data from an unauthorized address can be temporarily loaded into the CPU's cache during out-of-order execution. This cache presents a side-channel attack opportunity that allows an unprivileged process to bypass the normal privilege checks that isolate that process from accessing data belonging to the operating system. As a consequence, the unprivileged process can read data from any address that is mapped to the current process' virtual address space, including the kernel's address space.

The canonical defense against meltdown recommended by CPU vendors is to separate the kernel and user into two different address spaces. This technique, known as "page table isolation" (PTI), is employed in various operating systems including BSD, Linux, OS X, and Windows. Whereas current systems have a single set of process page tables for each process, PTI uses implements two sets of process page tables. One set is essentially unchanged; it includes both kernel-space and user-space addresses, but it is only used when the system is running in kernel mode. The second set contains a copy of all of the user-space mappings, but leaves out much the kernel side. Instead, there is a minimal set of kernel-space mappings that provides the information needed to handle system calls and interrupts, but no more. Whenever a process is running in user mode, the second set of process page tables will be active. The bulk of the kernel's address space will thus be completely hidden from the process, defeating the known hardware-based attacks. Whenever the system needs to switch to kernel mode, in response to a system call, an exception, or an interrupt, for example, a switch to the first set of process page tables will be used.

PTI has been shown to reduce the performance of some workloads by as much as 30% or more. Especially affected are workloads that frequently make system calls into the kernel and must therefore suffer PTI overhead associated with context switching. Presumably, meltdown could be fixed in future processors, potentially without a performance penalty. But it would be impractical if not impossible to fix the billions of processors already in service due to the hardware nature of the vulnerability. The situation is especially dire for embedded, real-time applications which use meltdown-vulnerable processors, such as avionics, railway controls, medical, industrial control, and other time-sensitive systems. These safety-critical systems may have been deployed with the expectation that the processor would operate in a fixed performance envelope, an assumption which may no longer hold if PTI is enabled for those systems.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
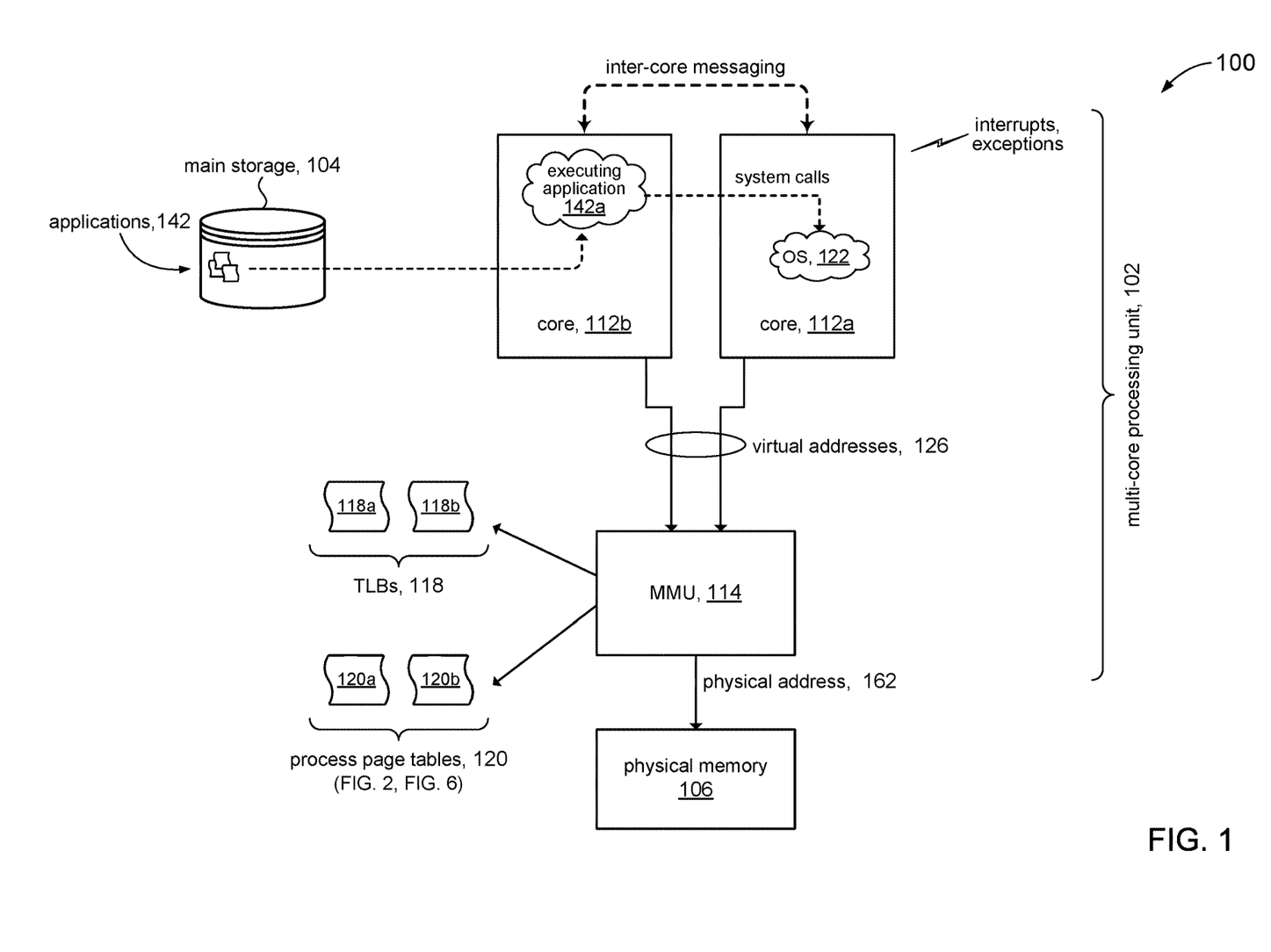
FIG. 1 shows a multi-core computer system in accordance with the present disclosure.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.
Core Separation FIG. 1 shows an illustrative configuration of a computer system 100 in accordance with some embodiments of the present disclosure. The computer system 100 can include a multi-core processing unit 102, main storage 104, and a physical memory 106, among other system elements that are not shown.

The multi-core processing unit 102 comprises an architecture that incorporates the core logic of multiple processing cores 112a, 112b to create a processing unit that can complete more tasks at the same time than single-core processors, thereby gaining better overall system performance. In some embodiments, the multi-core processing unit 102 may be a single integrated circuit that packages the processing cores 112a, 112b. In some embodiments, the processing cores 112a, 112b can be based on a 64-bit architecture.

The multi-core processing unit 102 can include a memory management unit (MMU) 114 to provide and support the virtual memory using the physical memory 106. The figure illustrates the MMU 114 as a common unit that is shared by the processing cores 112a, 112b. It will be appreciated that in other embodiments, the functionality and components comprising the MMU 114 can be distributed among the processing cores 112a, 112b. For discussion purposes, a single MMU configuration can be assumed without loss of generality.

The MMU 114 can translate a virtual addresses 126 received from the processing cores 112a, 112b into a physical address 162 that identifies a memory location in physical memory 106. The MMU 114 can use translation lookaside buffers (TLBs) 118 to facilitate the translation process. In some embodiments, for example, the TLBs 118 can be associative caches that store recent translations of virtual addresses to physical addresses to reduce translation time for faster access to physical memory 106. In accordance with the present disclosure, the MMU 114 can maintain separate TLBs 118a, 118b to support virtual address translation for respective processing cores 112a, 112b.

Each of the processing cores 112a, 112b in the multi-core processing unit 102 can execute instructions in "kernel mode" (also referred to variously as supervisor mode, privileged mode, etc.) or in "user mode." In some embodiments, a processing core 112a, 112b can include a set of control registers (not shown) to support the processing core's operations. The MMU 114 can perform virtual to physical address translation using process page tables 120 to translate a virtual address 126 into a physical address 162. The control registers in a processing core 112a, 112b, can specify a set of process page tables 120a, 120b to support its virtual memory address space. For example, Intel® CPUs have set of control registers to control operation of the CPU. One register, referred to as CR3, stores the address (pointer) of the root page of the process page tables used to map virtual addresses to physical addresses. In accordance with the present disclosure, the OS 122 can define a first virtual address space for the execution application using a first set of process page tables 120a, and a separate second virtual address space for the executing application (e.g., 142a) using a second set of process page tables 120b. This aspect of the present disclosure is discussed in more detail below.

The main storage 104 can be any type or form of storage device or medium capable of storing data and/or other computer-readable instructions. For example, main storage 104 can be a magnetic disk drive (e.g., a so-called hard drive), a solid state drive, a floppy disk drive, a magnetic tape drive, an optical disk drive, a flash drive, or the like. In some embodiments, main storage 104 can comprise a removable storage unit to store computer software, data, or other computer-readable information. Examples of suitable removable storage units include, for example, a floppy disk, a magnetic tape, an optical disk, a flash memory device, or the like. The main storage 104 can store executable applications 142 (binary files) comprising computer instructions for execution on a processing core 112a, 112b comprising the multi-core processing unit 102.

The physical memory 106 can be any type or form of storage device or medium capable of storing data and/or other computer-readable instructions. Examples of physical memory 106 include, for example, random access memory (RAM), flash memory, or any other suitable memory device.

In accordance with the present disclosure, an operating system (OS) 122 can be loaded on one of the processing cores 112a for execution. The operating system (OS) 122 can be configured to support the execution of applications 142, to handle interrupts and exceptions, and so on. Further in accordance with the present disclosure, a non-privileged user application 142a can be loaded on another processing core 112b for execution, separate from the processing core on which the OS 122 is executing. The user application 142a is non-privileged in that it does not have full access to the address space of the OS, nor can it execute in kernel mode.

The executing application 142a (also referred to as a "process"), executing on one processing core (e.g., 112b), can make system calls into the OS 122, executing on another processing core (e.g., 112a), to perform tasks such as reading or writing data, communicating with devices, and so on. In some embodiments, for example, the processing cores 112a, 112b can be configured with a suitable form of inter-core messaging so that processing in one processing core can be passed off to continue in another processing core. Processing logic and techniques for coordinating among cores in a multi-core processor are known to those of ordinary skill.

Figure 2:
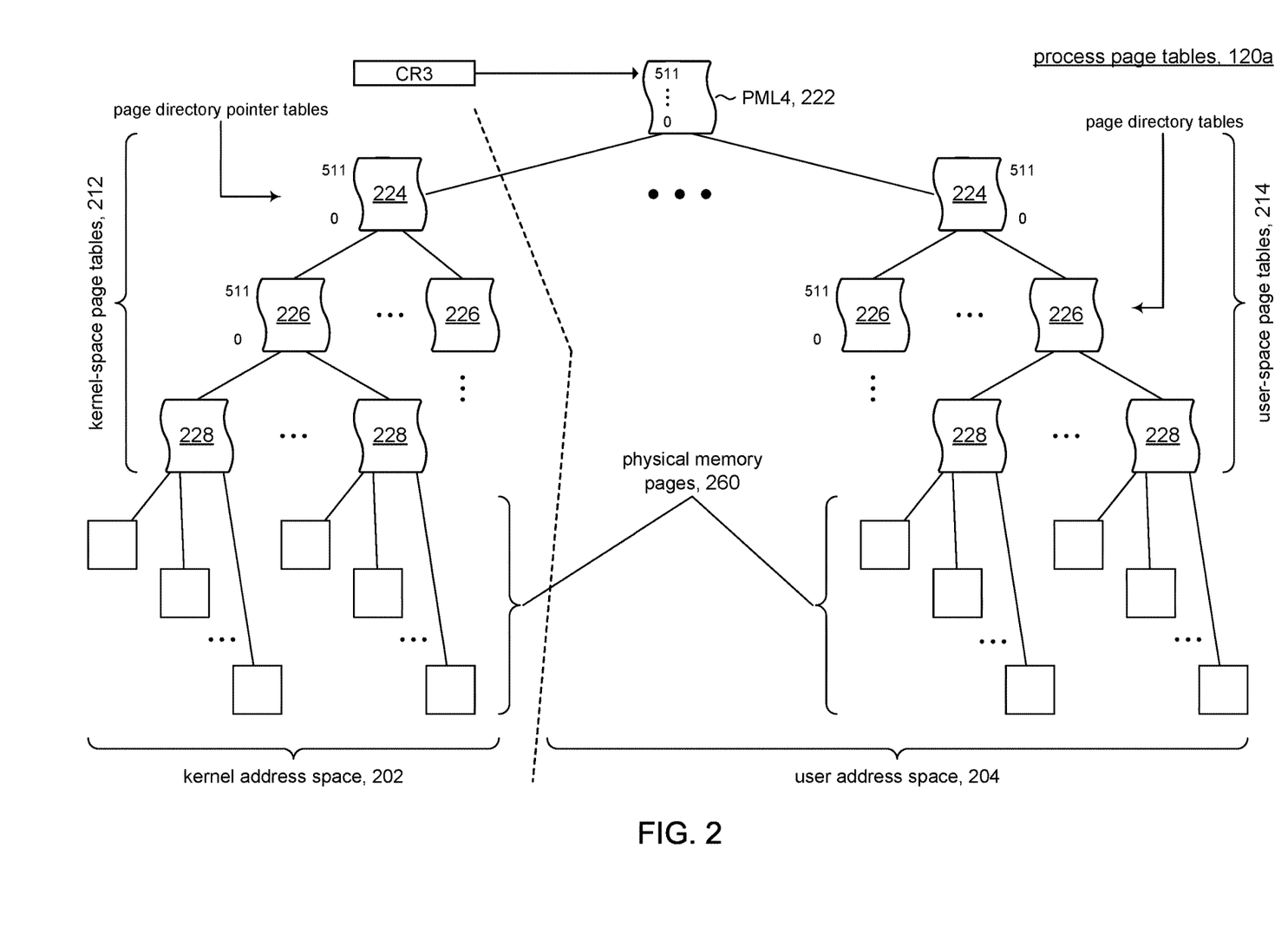
FIG. 2 illustrates an example of process page tables used to define a virtual address space without page table isolation.

FIG. 2 shows an illustrative example of a set of process page tables 120a to define a first virtual address space for the application. The MMU 114 can use the process page tables 120a to perform virtual address to physical address translation on behalf of the OS. In some embodiments, the MMU 114 can divide the virtual address space (the range of addresses used by the processor) into pages, each having a size which is a power of 2, usually a few kilobytes, but they may be much larger.

The process page tables 120a can divide the virtual address space into a kernel address space 202 and a user address space 204. The kernel address space 202 is reserved for the OS 122 and privileged processes. The user address space 204 is unique to each process; e.g., a given process (e.g., executing application 142*a*) will have a user address space that cannot be accessed by another process. The memory mapping tables that are associated with the kernel address space 202 can be referred to generally as the kernel-space page tables 212. Likewise, the memory mapping tables that are associated with the user address space 204 can be referred to generally as the user-space page tables 214.

The process page tables 120*a* can be organized in a hierarchy of memory mapping tables, which in some embodiments can be stored in physical memory 106. In some embodiments, the hierarchy comprises four levels of memory mapping tables. Each memory mapping table in the hierarchy comprises 512 table entries (e.g., indexed from 0-511), so 9 bits would be used to index each memory mapping table. It will be appreciated that in other embodiments the memory mapping tables can be defined with different size parameters.

The top-most (root) memory mapping table 222 in the hierarchy can be referred to as PML4 (page map level 4). Table entries in PML4 222 can include pointers (physical memory addresses) to the next level memory mapping tables 224, which in some embodiments are referred to as "page directory pointer" tables. Table entries in the page directory pointer tables 224 can include pointers to the third level memory mapping tables 226, which in some embodiments are referred to as "page directory" tables. Table entries in the page directory tables 226 can include pointers to the fourth level memory mapping tables 228, which in some embodiments are referred to as "page" tables. Table entries in the page tables 228 can include pointers to pages (physical memory pages) 260 of physical memory 106. A description of virtual to physical address translation using the process page tables 120*a* is discussed below.

The user address space 204 addresses those portions of physical memory 106 that a process has read and write access to. Access to portions of physical memory 106 that map to the kernel address space 202 are generally restricted to the OS 122 and privileged processes. Accordingly, access attempts to the kernel address space 202 by an unprivileged process executing in user mode can raise exception events in the CPU. In some embodiments, for example, the memory mapping tables can include a bit (not shown) or other information that indicates a given physical memory page 260 is mapped to the kernel address space 202. When the processor 102 is executing in user mode, an access to that physical memory page 260 can raise an exception (e.g., from MMU 114, FIG. 1), which can be handled by the OS 122 (e.g., the OS can "kill" the offending process).

In accordance with the present disclosure, the process page tables 120*a* shown in FIG. 2 define the full virtual address space. In other words, PTI is disabled and the process page tables 120*a* map the entire user address space 204 of a given process and the entire kernel address space 202 to physical memory 106. It is understood that there is a set of process page tables 120*a* for each process. More particularly, the process page tables 120*a* for given process comprises a set of user-space page tables 214 that is unique to that process, since each process has its own user address space. It is noted, on the other hand, that the set of kernel-space page tables 212 defines a kernel address space that is common to each process since the OS 122 uses the same kernel address space.

Figure 3:
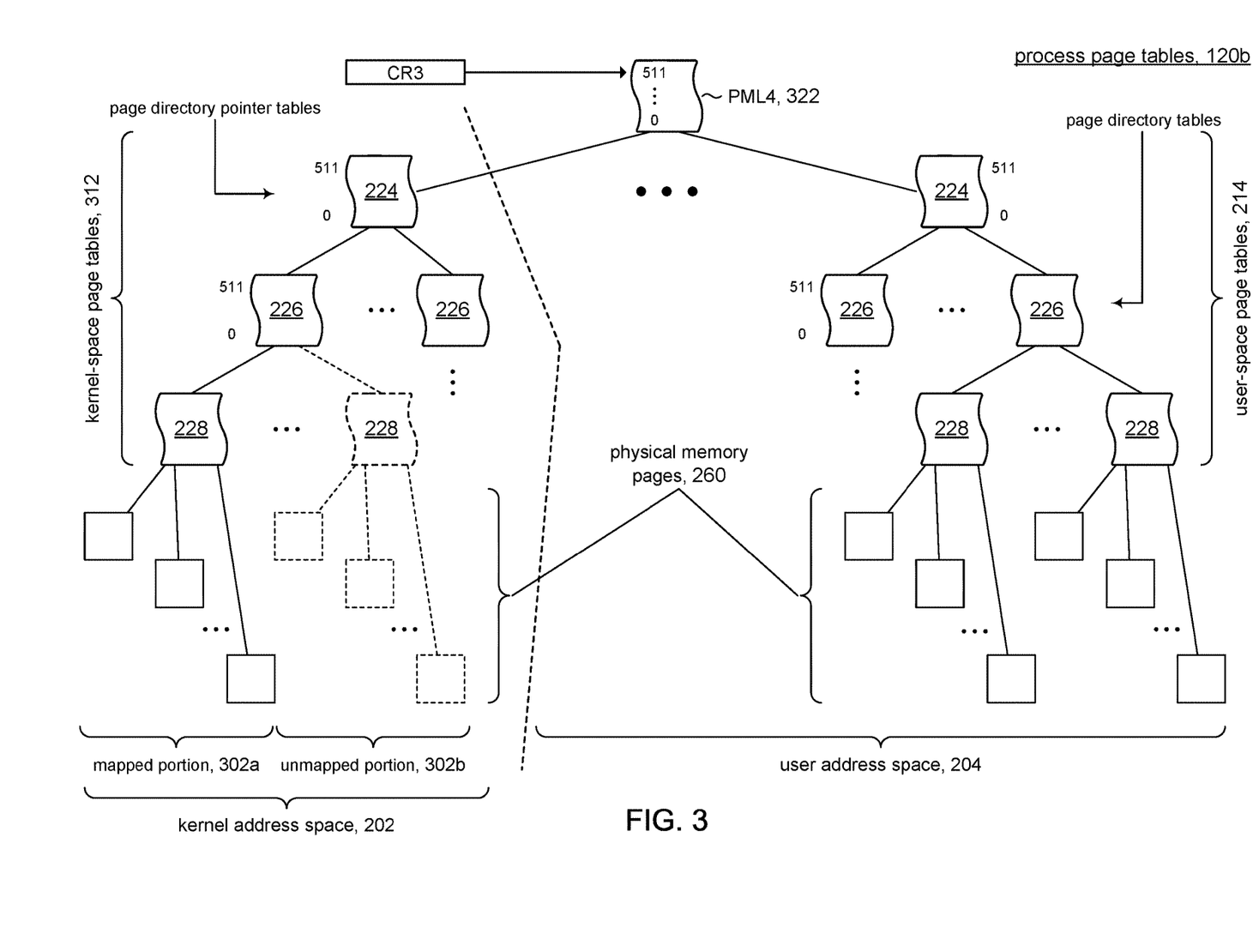
FIG. 3 illustrates an example of process page tables used to define a virtual address space with page table isolation.

Referring to FIG. 3, in accordance with the present disclosure a second virtual address space can be defined for an executing application. In particular, the second virtual address space can be defined using PTI-enabled for process page tables. FIG. 3 shows an illustrative example of a set of process page tables 120*b* that can be used to define a second virtual address space for a process (e.g., executing application 142*a*). In some embodiments, for example, the root page 322 can point to kernel page tables 312 that map at most only a portion 302*a* of the entire kernel address space 202, while pointing to user-space page tables 214 that map the entire user address space 204 of the process.

The mapped portion 302*a* of the kernel address space 202 represents that portion of the kernel address space 202 which contains a small amount of kernel ("trampoline") code needed to provide system call entry and exit points, interrupt handling (e.g., interrupt descriptor table), exception handlers, and the like. The unmapped portion 302*b* of the kernel address space 202 represents that portion of the kernel address space 202 that should be isolated from the process to prevent speculative access by that process. Accordingly, page tables corresponding to the unmapped portion 302*b* of the kernel address space 202 can be omitted from the process page tables 120*b* of the process, effectively isolating the sensitive unmapped portion 302*b* of the kernel address space from the process.

Figure 4:
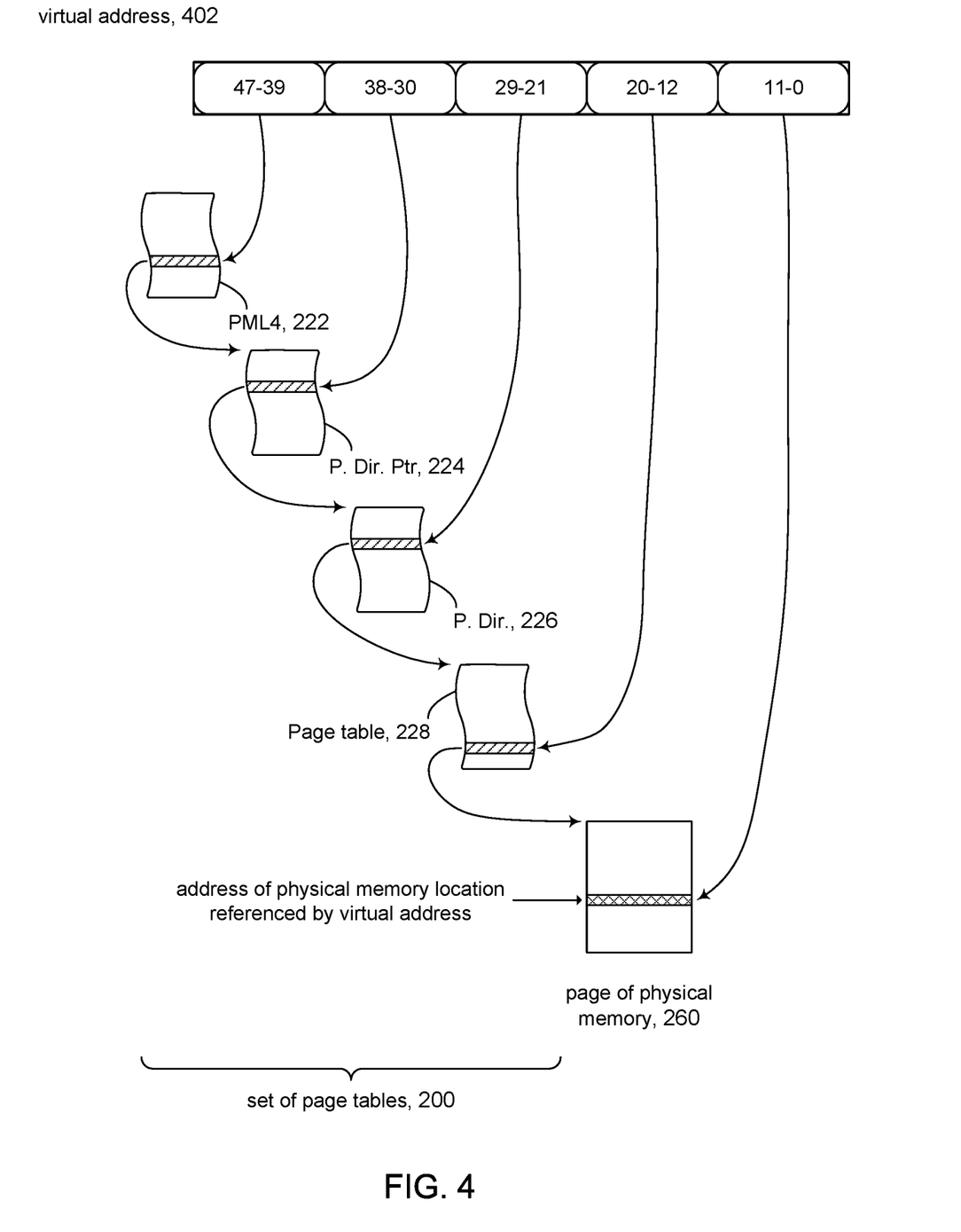
FIG. 4 shows an illustrative example of translating virtual address to a physical address.

Referring to FIG. 4, the discussion will now turn to a brief description of how a virtual address 402 can be translated to a physical address, for example in the MMU 114. The description will use the process page tables 120*a* (FIG. 2) as a reference. As explained above, the CPU can load a pointer to the process page tables 120*a* associated with the current process for which virtual addresses are to be translated to physical addresses. We can assume without loss of generality that the virtual address 402 is a 48-bit address. The first nine bits 47-39 of the virtual address 402 serve as an index into the PML4 (top level memory mapping table 222), recalling that in this example the memory mapping tables have 512 entries. The table entry indexed by bits 47-39 points to a page directory pointer table 224. The next nine bits 38-30 of the virtual address 402 serve as an index into the page directory pointer table 224, which stores a pointer to a page directory table 226. Continuing, bits 29-21 are used to index into the page directory table 226 to identify a page table 228. Finally, bits 20-12 index into page table 228 to identify the physical address of the page of physical memory 260. The final bits 11-0 in the virtual address 402 is an offset value that is added to the identified physical address to obtain the address of the physical memory location in physical memory 106 that the virtual address 402 translates to (assuming each page of physical memory 260 is $2^{12}$ bytes).

Figure 5:
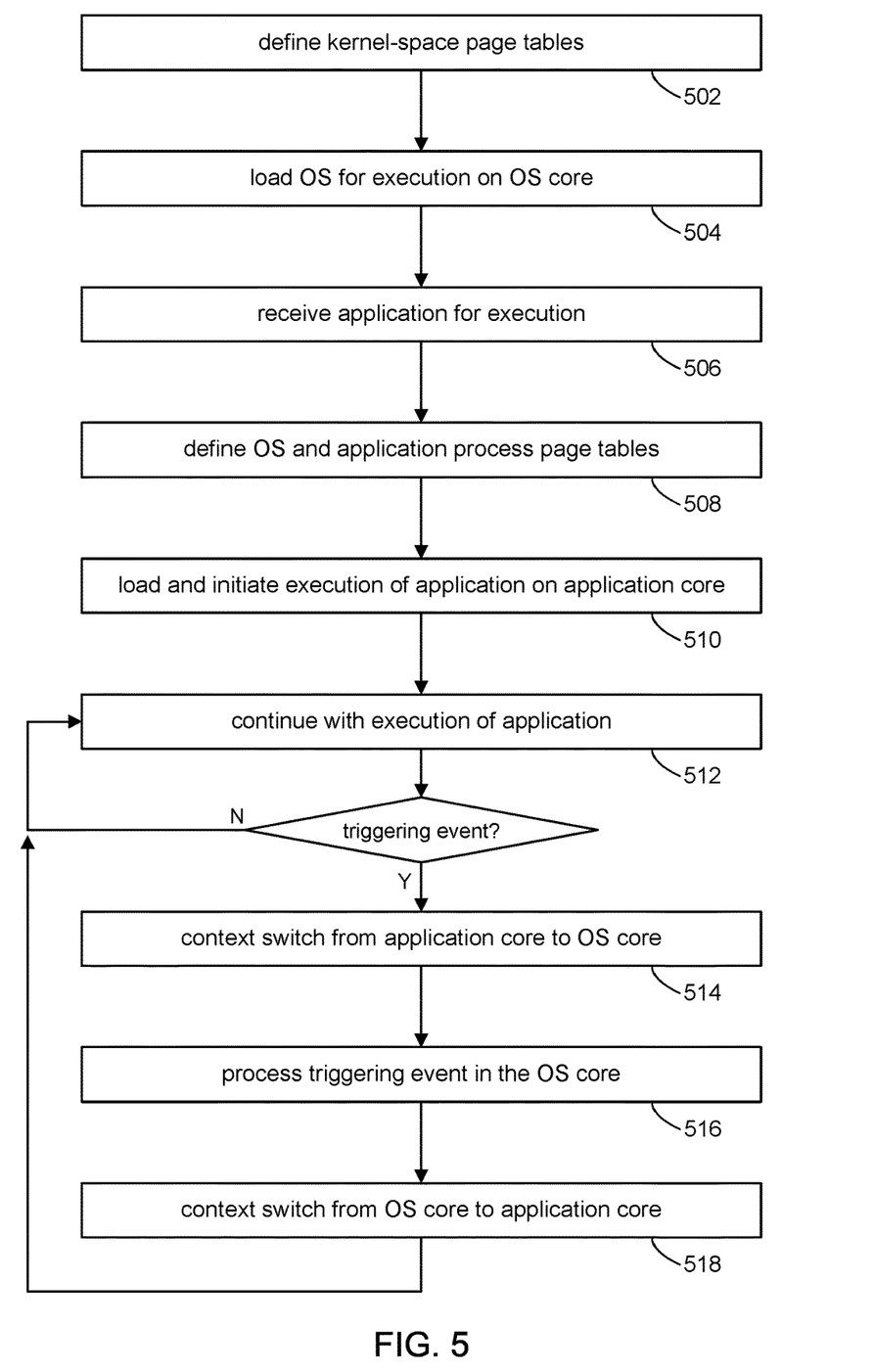
FIG. 5 depicts operations for switching between cores in accordance with some embodiments of the present disclosure.

Referring to FIG. 5, the discussion will now turn to a high level description of processing in a multi-core computer system (e.g., 100, FIG. 1) in accordance with the present disclosure to mitigate the meltdown vulnerability.

At operation 502, the computer system can define or otherwise provide kernel-space page tables for the operating system (OS). In some embodiments, this operation can be performed when the computer system boots up. In accordance with the present disclosure, one set of kernel-space page tables (e.g., 212, FIG. 2) can be defined to map the entire kernel address space of the OS to physical memory (e.g., 106, FIG. 1). Another (reduced) set of kernel-space page tables (e.g., 312, FIG. 3) can be define to map at most only a portion of the entire kernel address space. In some embodiments, for example, the portion of the kernel address space that is mapped can include system call entry points, an interrupt vector table for handling interrupts and exceptions, and the like.

At operation 504, the computer system can load the OS for execution. In accordance with the present disclosure, the OS can be loaded into an OS core (e.g., first processing core 112a, FIG. 1) selected from among the processing cores that comprise the computer system.

At operation 506, the computer system can access or otherwise receive via the OS an application to be loaded for execution. In some embodiments, for example, this operation can correspond to system call similar to the execv( ) system call in a UNIX-based OS to load and execute the application.

At operation 508, the computer system can define or otherwise provide process page tables used to support virtual addressing for the application. The computer system can define a user address space for the application and define a set of user-space page tables (e.g., 214, FIG. 2) that map the user address space to physical memory. In accordance with the present disclosure, the computer system can define a first virtual address space for the application to be loaded using a first set of process page tables (referred to herein as the OS page tables) comprising the user-space page tables and the (full) set of kernel-space page tables (e.g., 212, FIG. 2), which map the entirety of both the user address space and the kernel address space. Further in accordance with the present disclosure, the computer system can define a second virtual address space for the application to be loaded using a second set of process page tables (referred to herein as the application page tables) comprising the user-space page tables and a reduced set of kernel-space page tables (e.g., 312, FIG. 3), which maps the entire user address space, but only a portion of the kernel address space.

At operation 510, the computer system can load and initiate the application for execution on a processing core. In accordance with the present disclosure an application core (e.g., second processing core 112b, FIG. 1) other than the OS core, can be selected from among the processing cores that comprise the computer system. In accordance with the present disclosure, the computer system can configure the MMU (e.g., 114, FIG. 1) to use the application page tables for translating virtual addresses in the second virtual address space, received from the application core, to physical addresses in the physical memory. In some embodiments, for example, a pointer to the root page of the application page tables can be placed in a control register associated with the application core that the MMU can use for virtual address translation. Further in accordance with the present disclosure, the computer system can configure the MMU to use the OS page tables for translating virtual addresses in the first virtual address space, received from the OS core, to generate physical addresses, when a context switch occurs from execution in the application to execution in the OS. In some embodiments, for example, a pointer to the root page of the OS page tables can be placed in a control register associated with the OS core that the MMU can use to translate virtual addresses to physical address.

At operation 512, execution of the application can proceed in the application core. When the MMU receives virtual addresses from the application core, the MMU will translate those virtual addresses using the application page tables. As noted above, the virtual address space defined by the application page tables omits much of the kernel address space. In other words, the application executing on the application core is isolated from much of the kernel address space but otherwise has full access to its own user space address; i.e., PTI is enabled on the application core and the application has access to only a portion of the kernel address space sufficient to make system calls and to be able to respond to interrupts and exceptions. As discussed above, on meltdown-vulnerable CPUs, a user application can speculatively access the privileged kernel address space, thereby leaking kernel data indirectly. Since PTI is enabled, the application page tables fix the leak by separating user-space and kernel-space page tables entirely to isolate the kernel-space page tables from the executing application. With PTI enabled, the kernel address space is not mapped and so the virtual address range in the second processing core does not include the kernel space. Accordingly during out-of-order execution, the second processing core will not generate speculative addresses into the kernel space to begin with.

At operation 514, the computer system can perform a context switch from the application core to the OS core. A context switch can occur, for example, when the application makes a system call; for example, open( ) read( ) write( ) etc. A context switch can also be initiated in response to an interrupt (e.g., I/O) or exception (e.g., divide by zero) that occurs while the application is executing. When the application initiates a system call or an interrupt or exception, thin kernel code (syscall and interrupt entry points) executing on the application core can be accessed by the PTI-enabled application page tables to respond to the triggering event. The kernel code is deemed to be "thin" in that the code would not load the full kernel address-space of the OS and would not handle the event directly. Instead, the thin kernel code coordinates with the OS core, which runs in the full kernel address space, and informs the OS about the triggering event in order to transfer processing of the triggering event from the application core to the OS core. The thin kernel code then waits for a response from the OS core, letting the OS process the triggering event.

At operation 516, the OS executing on the OS core can process the triggering event. The OS page tables map the entire kernel address space so the OS has full access to both the user address space and the kernel address space to process the triggering event.

At operation 518, when the OS completes processing the triggering event, the OS core can perform a context switch from the OS core back to the application core, where execution of the application can continue on the application core at operation 512.

PTI processing in a single core processor architecture requires flushing entries in the TLB and updating the TLB each time the process page tables are changed between PTI-enabled page tables and PTI-disabled page tables during a context switch, which can be a time consuming effort that degrades performance of the computer system. In addition, processing cache misses in the flushed TLB further degrades performance because the MMU needs to traverse the hierarchy of memory mapping tables comprising the process page tables to repopulate the TLB.

By comparison, a multi-core computer system in accordance with the present disclosure executes an application on one processing core (application core) and executes the OS on a separate processing core (OS core). The process page tables on the application core can be PTI-enabled, but PTI-disabled on the OS core. Context switching involves handing off the processing between the application core and the OS core, and does not require changing between PTI-enabled page tables to PTI-disabled page tables. Thus, when executing in user mode, meltdown is mitigated by virtue of the application having PTI-enabled process page tables, and when executing in kernel mode, process page tables used by the OS provide access to the entire virtual address space. Since the process page tables remain constant within each processing core, the TLBs associated with each processing core are not flushed during context switches, and the performance penalties associated with flushing the TLBs do not arise while at the same time mitigating the risks of the meltdown vulnerability that PTI provides.

Memory Segmentation

Memory segmentation is a feature of the x86 architecture which provides an alternative to paging for memory protection. The x86-64 bit architecture no longer supports segmentation in 64-bit mode (the segment registers are zeroed). However, since many 32-bit processors are affected by meltdown, and those processors will suffer the most from PTI due to the lack of advanced features, segmentation may present itself as a reasonable alternative to PTI in some embodiments since 32-bit processors are still manufactured in use in many embedded systems.

Figure 6:
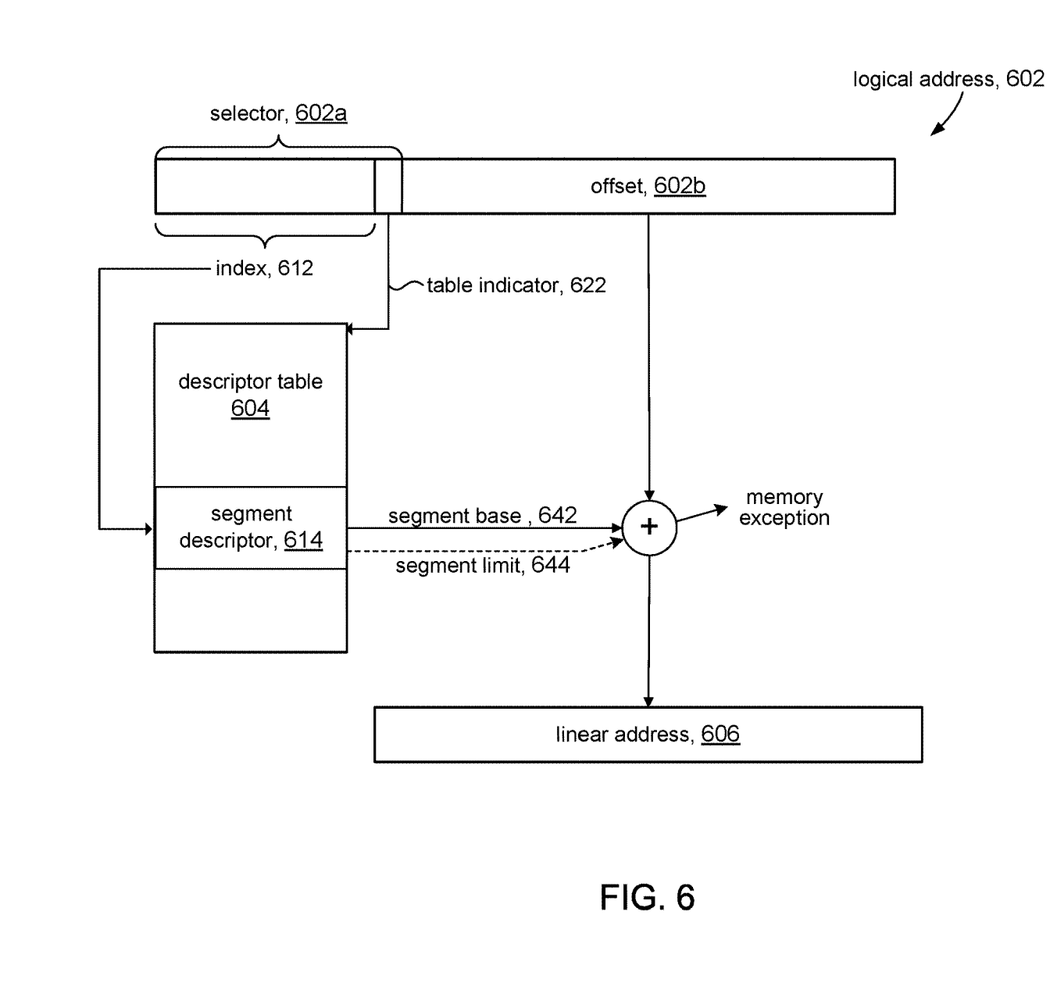
FIG. 6 illustrates memory segmentation.

The description will now turn to a discussion of logical address to linear address translation using memory segmentation in accordance with some embodiments. The discussion will use the memory segmentation model of the Intel® 80386 processor as an example. Referring to FIG. 6, the translation process includes a receiving a logical address 602 comprising a selector 602a and an offset 602b. The selector 602a includes a table indicator 622 that identifies a descriptor table 604, and an index 612 that is used to index the descriptor table 604 to identify a segment descriptor 614. The offset 602b is added to a segment base component 642 of the segment descriptor to produce a linear address 606. A segment limit component 644 of the segment descriptor can be used limit the value of the resulting linear address 606. Segment registers (not shown) store information from the segment descriptors 614, thereby avoiding the need to consult the descriptor table 604 every time it accesses memory.

Figure 7:
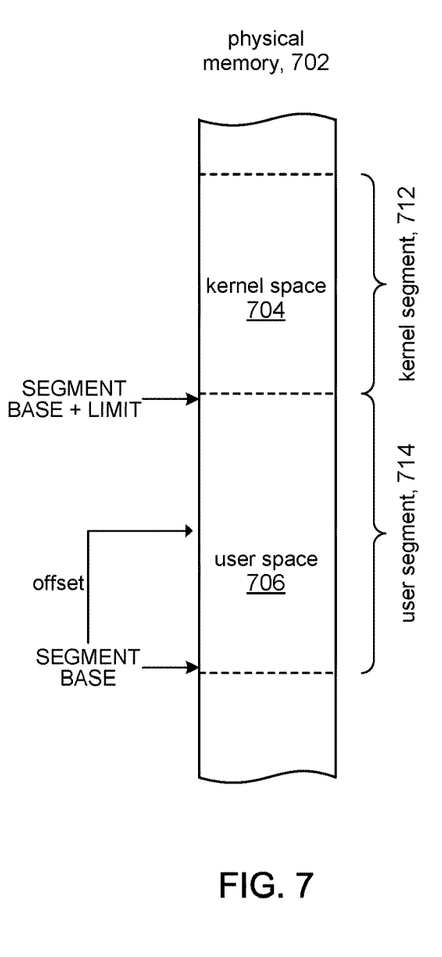
FIG. 7 shows a physical memory and a memory segment define in the physical memory.

FIG. 7 illustrates the foregoing described memory segmentation processing in the context of the present disclosure. A physical memory 702 can be divided into a kernel space segment 712 and a user space segment 714. A segment descriptor (e.g., 614) can be set up in the descriptor table 604 that defines the kernel space segment 712, and another segment descriptor can be set up to define the user space segment 714. The figure only represents the kernel space as a single memory segment and the user space as a single memory segment in order to avoid cluttering the figure with too much detail. It will be appreciated that the kernel space (and the user space) comprises a code segment and a data segment.

Logical addresses 602 in the kernel space segment 712 are defined with a selector 602a that indexes (e.g., index 612) the segment descriptor that defines the kernel space segment 712. Likewise, logical addresses in the user space segment 714 are defined with a selector 602a that indexes the segment descriptor that defines the user space segment 714. These logical addresses, for example, can be defined at compilation time, when source code is compiled to generate executable code.

Referring to FIGS. 6 and 7, in operation, when the sum of the segment base 642 from an accessed segment descriptor 614 and the offset 602b of the logical address 602 exceeds the segment limit 644, that occurrence can raise a memory exception which can then be intercepted. Thus, for example, malicious code may include or generate an offset value for a user-space logical address 602 that produces a linear address 606 falling within the kernel space segment 712. The segment limit 644 can be used to prevent such direct attacks into the kernel space. Since the descriptor table 604 is a table defined within the kernel space by the OS, the segment descriptors 614 (and hence the segment limit 644) cannot be accessed/attacked by user applications. It has been the inventor's observations that the segment limit 644 is also in force during speculative access to prevent the processor from speculatively loading information or otherwise speculatively accessing the kernel space, and thus avoiding the occurrence of meltdown.

Figures 8, 9:
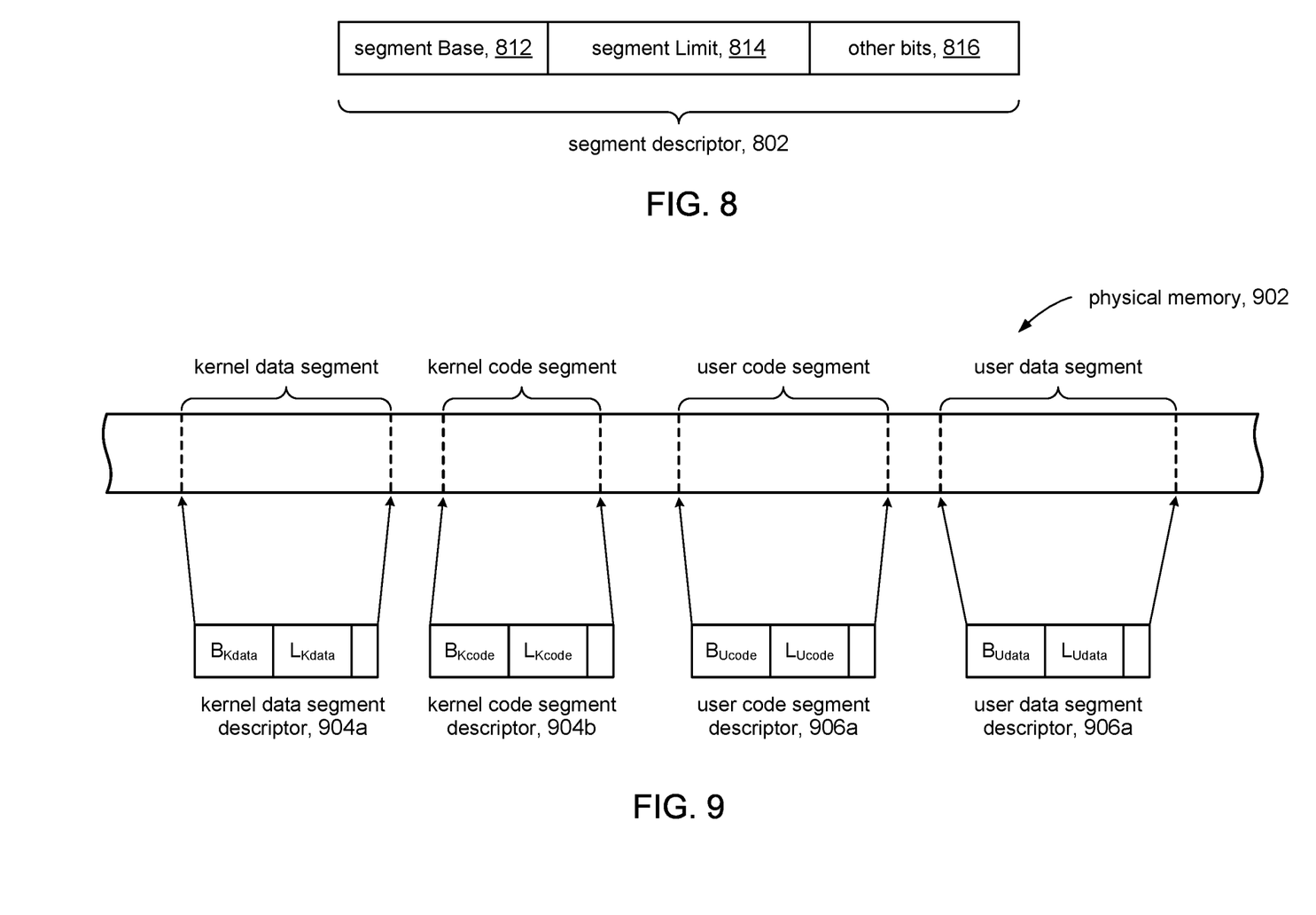
FIG. 8 illustrates a high level view of a segment descriptor.
FIG. 9 shows an example of a physical memory with code and data segments.

FIG. 8 is a high level diagram detailing a segment descriptor 802. In addition to the segment base 812 and segment limit 814, the segment descriptor 802 includes bits 816 that describe other aspects of the segment that the segment descriptor defines. For example, a granularity bit specifies the resolution of the segment limit 814; when cleared, the limit is expressed in units of one byte and when set, the limit is expressed in units of 4 KB.

FIG. 9 shows segment descriptors that define a kernel space comprising a kernel data segment and a kernel code segment, and a user space comprising a user data segment and a user code segment in physical memory 902. The kernel space is defined by a kernel data segment descriptor 904a and a kernel code segment descriptor 904b. Likewise, the user space is defined by a user data segment descriptor 906a and a user code segment descriptor 906b. The memory segments that comprise the kernel space and user space can be contiguous segments, as shown in FIG. 7 for example, or can be non-contiguous as illustrated in FIG. 9.

OBSERVATIONS AND CONCLUSION

Meltdown exploits the speculative execution mechanism of the processor, tricking it to access privileged data. While speculative execution correctly prevents unprivileged processes from directly reading the speculative results, speculation has side-effects that can be observed and exploited by unprivileged processes. The meltdown proof-of-concept is able to deduce privileged data using timing attacks against data left in the cache. Future potential exploits could perhaps use other side-channels (such as counters or power). Thus, a robust defense against meltdown should eliminate speculative execution on privileged data completely.

Figure 10:
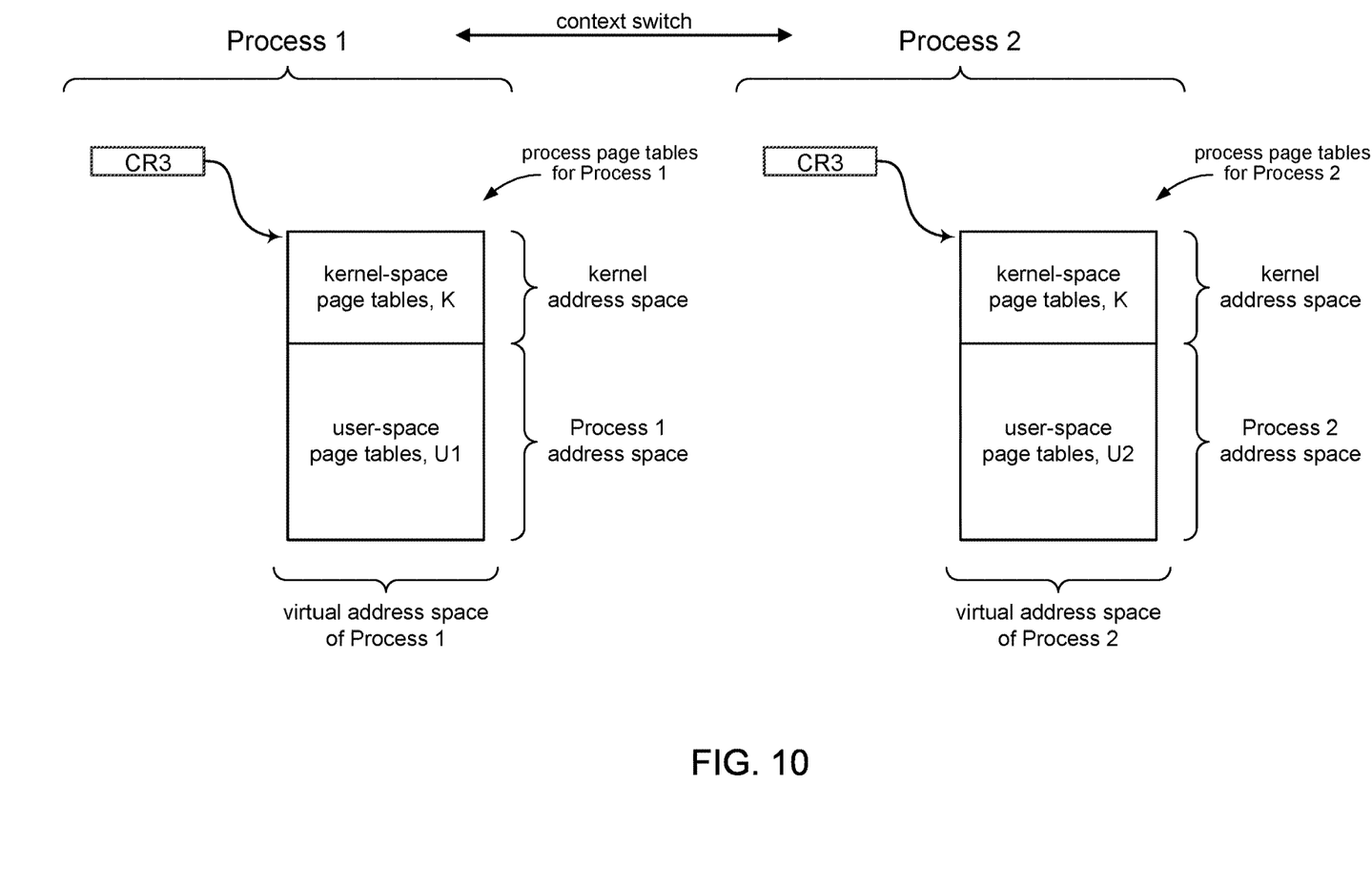
FIG. 10 illustrates kernel and user address spaces during context switching without page table isolation.

Let P be a kernel memory page that an unprivileged process U is forbidden to access. U may speculatively read P only if U has P mapped in its page table, which means there exists a virtual memory address V that U can use to refer to P. Before meltdown, V existed because OSes typically mapped P (along with the entire system memory) in the process page tables of each process; see, for example, FIG. 10. For protection, OSes relied on hardware, marking P as "supervisor" in the page table entry for P, thereby instructing the CPU to allow only the kernel to access P. OSes additionally marked P as "global", which means that the P→V mapping remains valid across context switches in the TLB used to accelerate virtual-to-physical address translations.

Figure 11:
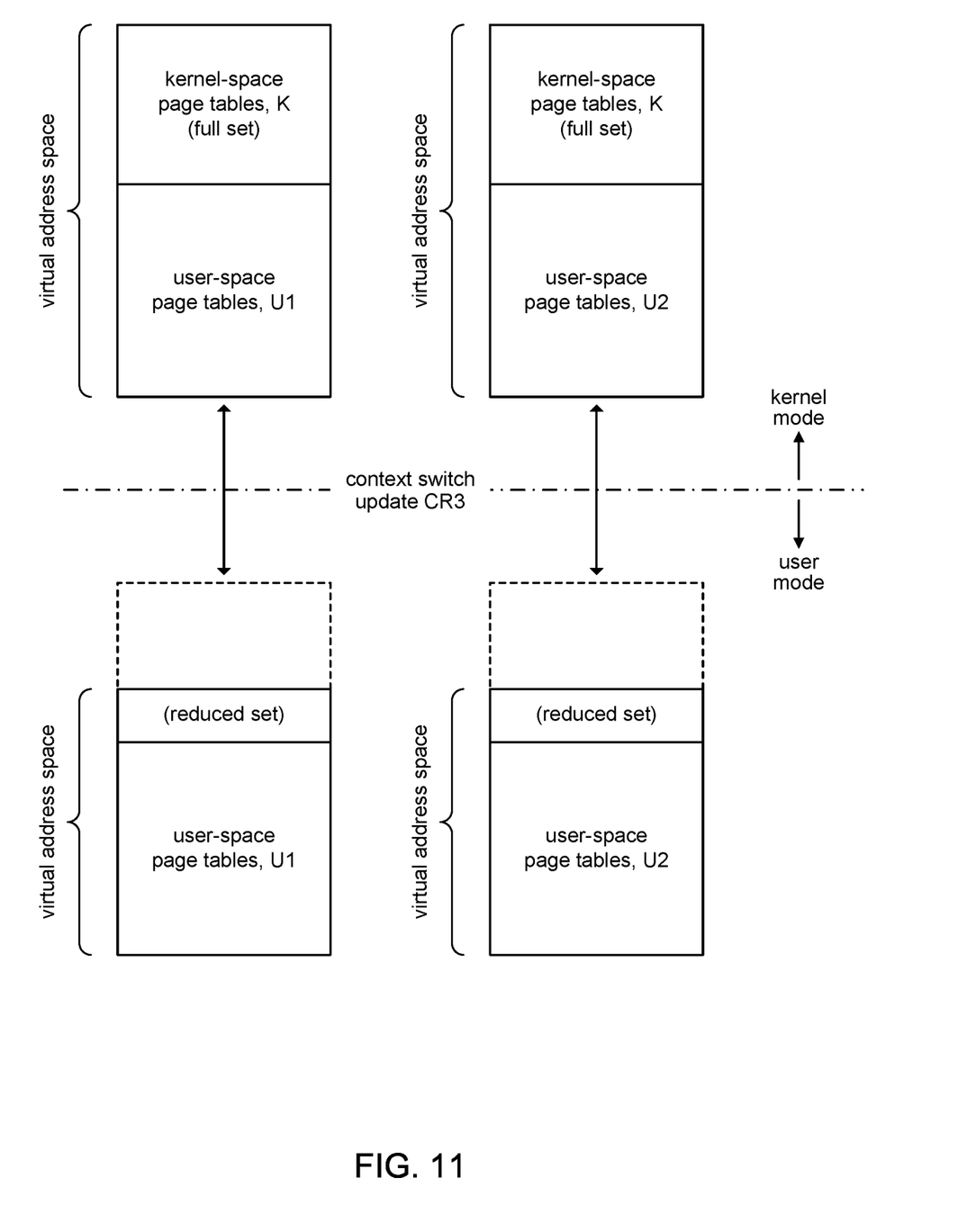
FIG. 11 illustrates kernel and user address spaces during context switching with page table isolation in accordance with the present disclosure.

Meltdown-vulnerable CPUs defer checking the supervisor bit, allowing cores to speculatively execute using privileged mappings and thereby opening a side-channel that U might exploit. Kernel page table isolation (PTI) described above addresses the problem by removing most kernel mappings from the process' virtual address space and maintaining a second, fuller virtual address space to be used by the kernel when servicing U; see, for example FIG. 11.

As explained above, the virtual address space can correspond to one PML4, which serves as the root of a page-table hierarchy that translates virtual addresses to physical addresses. The CR3 register holds the physical address of the PML4 of the currently running process. A context switch includes storing a new address into CR3, causing non-global TLB entries to be flushed. Before PTI, the OS kept CR3 as is when servicing system calls (or interrupts); CR3 changed only when switching from one process to another, and even then the kernel address mappings remained valid in the TLB because the kernel-space page tables did not change from one process to another (e.g., FIG. 10). In contrast, with PTI, the OS updates CR3 upon each kernel entry and exit, for every system call (e.g., FIG. 11), and no global mappings are used so as to defend against meltdown. The user's PML4 (i.e., process page tables) only allows access to the minimal kernel-space page tables needed, notably to enter the kernel ("trampoline") to perform interrupt handling and system call entry. The kernel's PML4, on the other hand, encompasses both user-space and kernel-space mappings.

In some embodiments, PTI-enabled and PTI-disabled PML4's for a given process can be physically contiguous, so switching between them can be done by flipping only one CR3 bit, without having to map potentially sensitive OS data. The two PML4's can point to the same user-space page tables, so that updates need only be applied once, albeit TLB invalidations must be applied twice. As noted above, updating mappings is expensive, not only in terms of the direct cost of flushing and updating the TLB, but also due to TLB misses that occur as a result from having different kernel mappings in each address space.

In summary, PTI secures the kernel from meltdown at the cost of more overhead due to switching process page tables. The overhead may have minimal impact for compute-bound workloads, but can be substantial for I/O intensive workloads that invoke system calls frequently.

Embodiments in accordance with the present disclosure avoid having to switch process page tables between context switches by execution the application and OS in separate processing cores. Meltdown is mitigated by enabling PTI on the process page tables only on the application processing core, while using a full set of process page tables that map the entire kernel address space on the OS processing core.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method for executing an application on a computing system, the method comprising:
    executing an operating system (OS) on a first processing core selected from among a plurality of processing cores in the computing system;
    translating virtual addresses in a first virtual address space of an application received from the first processing core using a first set of page tables that maps an entire user address space of the application and an entire kernel address space of the OS to a physical memory shared by the plurality of processing cores;
    executing the application on a second processing core selected from among the plurality of processing cores in the computing system; and
    translating virtual addresses in a second virtual address space of the application received from the second processing core using a second set of page tables that maps the entire user address space of the application and at most only a portion of the kernel address space of the OS to the physical memory.

2. The method of claim 1, wherein the first processing core always uses the first set of process page tables when translating virtual addresses in the first virtual address space of the application.

3. The method of claim 1, wherein the second processing core always uses the second set of process page tables when translating virtual addresses in the second virtual address space of the application.

4. The method of claim 1, wherein the application is a 64-bit application.

5. The method of claim 1, wherein the first and second processing cores are based on a 64-bit architecture.

6. The method of claim 1, further comprising switching execution from the second processing core to the first processing core in response to occurrence of an interrupt or an exception in the second processing core, and handling the interrupt or exception by the OS that is executing in the first processing core.

7. The method of claim 6, further comprising the OS accessing the kernel address space using the first set of page tables.

8. The method of claim 6, further comprising sending a message from the second processing core to the first processing core in response to a system call made by the application on the second processing core and handling the system call in the first processing core.

9. A non-transitory computer-readable storage medium having stored thereon computer executable instructions, which when executed by a computer device, cause the computer device to:
    execute an operating system (OS) on a first processing core selected from among a plurality of processing cores comprising the computer device;
    translate virtual addresses in a first virtual address space of an application received from the first processing core using a first set of page tables that maps an entire user address space of the application and an entire kernel address space of the OS to a physical memory shared by the plurality of processing cores;
    execute the application on a second processing core selected from among the plurality of processing cores comprising the computer device; and
    translate virtual addresses in a second virtual address space of the application received from the second processing core using a second set of page tables that maps the entire user address space of the application and at most only a portion of the kernel address space of the OS to the physical memory.

10. The non-transitory computer-readable storage medium of claim 9, wherein the first processing core always uses the first set of process page tables when translating virtual addresses in the first virtual address space of the application.

11. The non-transitory computer-readable storage medium of claim 9, wherein the second processing core always uses the second set of process page tables when translating virtual addresses in the second virtual address space of the application.

12. The non-transitory computer-readable storage medium of claim 9, wherein the computer executable instructions, which when executed by the computer device, further cause the computer device to switch execution from the second processing core to the first processing core in response to occurrence of an interrupt or an exception in the second processing core, and handle the interrupt or exception by the OS that is executing in the first processing core.

13. The non-transitory computer-readable storage medium of claim 12, further comprising the OS accessing the kernel address space using the first set of page tables.

14. The non-transitory computer-readable storage medium of claim 12, wherein the computer executable instructions, which when executed by the computer device, further cause the computer device to switch execution from the second processing core to the first processing core in response to a system call made by the application on the second processing core and handle the system call in the first processing core.

15. A computer apparatus comprising:
a plurality of processing cores;
a physical memory shared by the plurality of processing cores; and
a computer-readable storage medium comprising instructions for controlling the target processor to be operable to:
execute an operating system (OS) on a first processing core selected from among a plurality of processing cores;
translate virtual addresses in a first virtual address space of an application received from the first processing core using a first set of page tables that maps an entire user address space of the application and an entire kernel address space of the OS to the physical memory;
execute the application on a second processing core selected from among the plurality of processing cores; and
translate virtual addresses in a second virtual address space of the application received from the second processing core using a second set of page tables that maps the entire user address space of the application and at most only a portion of the kernel address space of the OS to the physical memory.

16. The apparatus of claim 15, wherein the first processing core always uses the first set of process page tables when translating virtual addresses in the first virtual address space of the application.

17. The apparatus of claim 15, wherein second processing core always uses the second set of process page tables when translating virtual addresses in the second virtual address space of the application.

18. The apparatus of claim 15, wherein the computer-readable storage medium further comprises instructions for controlling the target processor to be operable to switch execution from the second processing core to the first processing core in response to occurrence of an interrupt or an exception in the second processing core, and handle the interrupt or exception by the OS that is executing in the first processing core.

19. The apparatus of claim 18, further comprising the OS accessing the kernel address space using the first set of page tables.

20. The apparatus of claim 18, wherein the computer-readable storage medium further comprises instructions for controlling the target processor to be operable to switch execution from the second processing core to the first processing core in response to a system call made by the application on the second processing core and handle the system call in the first processing core.

* * * * *